United States Patent Office 3,557,193
Patented Jan. 19, 1971

3,557,193
1-(ALKYLAMINO)-3-(α-PHENYL BENZYL)OXY-PROPAN-2-OLS AND THE SALTS THEREOF
Wijbe Thomas Nauta, Nieuw Loosdrecht, Netherlands, assignor to N.V. Koninklijke Pharmaceutische Fabrieken v/h Brocades-Stheeman & Pharmacia, Looiersgracht, Amsterdam, Netherlands
No Drawing. Filed Sept. 15, 1967, Ser. No. 668,214
Int. Cl. C07c 93/06
U.S. Cl. 260—501.18
3 Claims

ABSTRACT OF THE DISCLOSURE

This invention relates to new, therapeutically useful benzhydryl aminopropanol ethers and acid addition salts thereof, to processes for their preparation and to pharmaceutical compositions containing them. The compounds of this invention have been found to possess activity as antiarrhythmic and local anaesthetic agents.

---

This invention relates to new, therapeutically useful ethers and acid addition salts thereof, to processes for their preparation and to pharmaceutical compositions containing them.

New benzhydryl aminopropanol ethers of the invention are those of the general formula (I)

[Structure: two phenyl rings with substituents $R_1$, $R_2$, $R_3$, $R_4$, $R_5$ on one ring and $R_6$, $R_7$, $R_8$, $R_9$, $R_{10}$ on the other, joined by a CH group; bearing O—CH$_2$—CH(OH)—CH$_2$—NH—Q]

wherein $R_1$, $R_2$, $R_3$, $R_4$, $R_5$, $R_6$, $R_7$, $R_8$, $R_9$ and $R_{10}$ are the same or different and each represents hydrogen, halogen, alkyl or trifluoromethyl, $R_1$ and $R_{10}$ together represent a —CH$_2$—CH$_2$— or a —CH=CH— bridge linking the two phenyl nuclei or ortho places in relation to the ether grouping, and Q is alkyl; and acid addition salts thereof. By the term "alkyl" as used in this specification is meant straight or branched chain alkyl groups having at most six carbon atoms. Further, it is to be understood that when all the R's are hydrogen, the alkyl radical has from four to six carbons.

The ethers of Formula I have valuable therapeutic properties; they have spasmolytic and local anesthetic activities. Moreover, they show anti-arrhythmic properties which resemble those of quinidine but—contrary to what is known for chemically related groups of compounds—do not show β-sympatholytic activity. Preferred ethers are those in which one or both of the phenyl rings carry at least one alkyl substituent with a preferred compound being one wherein one of the R's represents isopropyl. The compounds of this invention can be tabletted or capsulated as set forth hereafter in amounts so that from 0.5 to 100 mg./kg. can be administered daily etiher orally or parenterally to humans or animals (e.g., dogs). The preferred dosage is from 5 to 25 mg. daily administered orally.

For use as therapeutics the compounds of Formula I may be used as bases or as acid addition salts containing pharmaceutically acceptable non-toxic anions, e.g., the hydrohalides, sulphates, oxalates, tartrates, fumarates, acetates, citrates, maleates, succinates, lactates and pamoates.

According to a feature of the invention, the compounds of Formula I are prepared by reacting a glycidyl ether of the general formula (II)

[Structure: benzhydryl system with $R_1$–$R_{10}$ substituents, bearing O—CH$_2$—CH—CH$_2$ with an epoxide (O bridge)]

with an amine of the formula H$_2$N—Q, wherein the various symbols are as hereinbefore defined. The reactants are advantageously heated in a closed vessel (for example, a Carius tube), preferably dissolved in an inert anhydrous solvent, such as benzene, toluene or xylene.

A benzhydryl amino propanol ether obtained by the aforementioned process may be converted into an acid addition salt as by the action of an acid on the base in an appropriate solvent, for example an ether.

The glycidyl ethers of Formula II are new except for the compound in which all the R symbols represent hydrogen; these new ethers, as such, form another feature of the invention. They have valuable therapeutic activities of their own; in particular muscle-relaxant, anti-convulsive and sedative properties and can be administered to patients, either animal or human in amounts of from 25 to 100 mg./kg. daily.

The compounds of Formula II are prepared, according to a feature of the invention, by reacting a benzhydryl halide of the general formula (III)

[Structure: benzhydryl system with $R_1$–$R_{10}$ substituents and Hal on the central CH]

wherein Hal represents a halogen atom and the other symbols are as hereinbefore defined, with 2,3-epoxy-propan-1-ol (glycidol):

(IV) $\quad$ HO—CH$_2$—CH—CH$_2$ (with epoxide O)

The reaction is preferably effected in an anhydrous inert organic medium, such as benzene, diethyl ether or tetrahydrofuran.

Another way to prepare the compounds of Formula II is by condensing a benzhydryl derivative of the formula (V)

[Structure: benzhydryl system with $R_1$–$R_{10}$ substituents and OM on the central CH]

wherein M represents an alkali metal (preferably sodium) atom and the other symbols are as hereinbefore defined, with epichlorohydrin:

(VI) $\quad$ Cl—CH$_2$—CH—CH$_2$ (with epoxide O)

The reaction is preferably effected by heating the reactants in an inert organic solvent, such as an aromatic hydrocarbon, for example benzene, toluene or xylene.

In still another method, the compounds of Formula II are prepared by epoxidation of an appropriately substituted benzhydryl allyl ether of hte formula (VII)
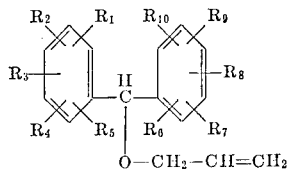

wherein the various symbols are as hereinbefore defined. The epoxidation is carried out in manner known per se, for example, with perbenzoic acid in benzene solution at a temperature between 0 and 5° C.

The compounds of Formula I or Formula II may also be prepared by the application of other methods known per se for the production of benzhydryl ethers.

The following examples illustrate the invention.

EXAMPLE 1

1-(isopropylamino)-3-[p-methyl-α-phenylbenzyl)oxy] propan-2-ol hydrochloride

In a closed vessel a mixture of 5.7 ml. of isopropylamine and a solution of 11.1 g. of 1,2-epoxy-3-[(p-methyl-α-phenylbenzyl)oxy]propane in 25 ml. of anhydrous benzene is heated for 16 hours at 80° C. After cooling, the mixture is treated with three portions of 20 ml. of water. The benzene layer is separated and dried with sodium sulphate. The solvent is removed by evaporation. By means of an electrometric titration, there is determined how many equivalents of benzhydryl aminopropanol ether are formed, whereupon an equivalent quantity of hydrogen chloride in diethyl ether is added. After crystallization from acetone, there is obtained 12.9 g. of 1 - (isopropylamino) - 3 - [(p-methyl-α-phenylbenzyl)oxy]propan-2-ol hydrochloride. Yield 83%; M.P. 146–148° C.

Analysis.—Calc'd for $C_{20}H_{28}NO_2Cl$ (percent): C, 68.58; H, 8.08; N, 4.00. Found (percent): C, 68.91; H, 8.08; N, 3.93.

The preparation of the benzhydryl glycidyl ether employed as starting material is described in the following example.

EXAMPLE 2

1,2-epoxy-3-[(p-methyl-α-phenylbenzyl)oxy]propane

A suspension is made of 11.1 g. of 2,3-epoxy-propan-1-ol (glycidol) and 15.9 g. of sodium carbonate in 30 ml. of anhydrous benzene. Precautions are taken that no moisture enters the vessel. The mixture is heated until the solvent boils under reflux. While stiring, 21.7 g. of (p-methyl-α-phenylbenzyl)chloride is added dropwise to the refluxing mixture. After completion of the addition, the mixture is stirred and kept refluxing for another 20 hours. After cooling and filtration, the solvent is removed from the filtrate by distillation. After crystallization from petroleum ether (boiling range 80–100° C.), there is obtained 13.9 g. of 1,2-epoxy-3-[(p-methyl-α-phenylbenzyl)oxy]propane. Yield 56%; B.P. 109–113° C./0.5 mm. Hg.

EXAMPLE 3

Following the general procedure described in Example 1, but substituting unsubstituted or different appropriately substituted benzhydryl glycidyl ethers for the 1,2-epoxy-3-[(p-methyl - α - phenylbenzyl)oxy]propane, the benzhydryl aminopropanol ethers of Formula I as described below are obtained in the form of their hydrochlorides.

| Compound | $R_1$ | $R_5$ | $R_{10}$ | $R_6$ | $R_2, R_3, R_4, R_7, R_8, R_9$ | Q | Melting point °C., HCl |
|---|---|---|---|---|---|---|---|
| A | o-Methyl | H | H | H | H | Isopropyl | 121–122 |
| B | o-t.-Butyl | H | H | H | H | do | 195–196 |
| C | o-Methyl | (¹) | (¹) | (¹) | H | do | 189–191 |

¹ o-Methyl.

Analytical data:

| | Calculated for | C | H | N | Found C | H | N |
|---|---|---|---|---|---|---|---|
| Compound: | | | | | | | |
| A | $C_{20}H_{24}NO_2Cl$ | 68.58 | 8.08 | 4.00 | 68.43 | 8.03 | 4.09 |
| B | $C_{23}H_{34}NO_2Cl$ | 70.52 | 8.69 | 3.57 | 70.54 | 8.70 | 3.71 |
| C | $C_{23}H_{34}NO_2Cl$ | 70.52 | 8.69 | 3.75 | 70.40 | 8.63 | 3.60 |

EXAMPLE 4

1-[(10,11-dihydro-5H-dibenzo[a,d]cyclohepten-5-yl)oxy]-3-(isopropylamino)propan-2-ol hydrochloride Following the general procedure described in Example 1 but substituting 1,2 - epoxy-3-[(10,11-dihydro-5H-dibenzo[a,d]cyclohepten - 5 - yl)oxy]propane for the 1,2-epoxy - 3 - [(p - methyl - α - phenylbenzyl)oxy]propane, 1-[(10,11 - dihydro - 5H - dibenzo[a,d]cyclohepten-5-yl)oxy]-3-(isopropylamino)propan-2-ol hydrochloride is obtained. Melting point 156–157° C.

Analysis.—Calc'd for $C_{21}H_{28}NO_2Cl$ (percent): C, 69.71; H, 7.79; N, 3.87. Found (percent): C, 69.51; H, 7.78; N, 3.90.

EXAMPLE 5

Following the general procedure described in Example 2 but substituting unsubstituted or different appropriately substituted benzhydryl chlorides for the (p-methyl-α-phenylbenzyl)chloride, the benzhydryl glycidyl ethers conforming to Formula II described below are obtained:

| Compound | $R_1$ | $R_3$ | $R_6$ | $R_{10}$ | $R_2, R_3, R_4, R_7, R_8, R_9$ | Melting point °C./10⁻² mm. Hg |
|---|---|---|---|---|---|---|
| A | o-Methyl | H | H | H | H | 128–131 |
| B | o-t.-Butyl | H | H | H | H | 158–160 |
| C | o-Methyl | (¹) | (¹) | (¹) | H | (²) |

¹ o-Methyl.
² Syrup.

The invention includes within its scope pharmaceutical preparations containing, as active ingredient, at least one of the therapeutically active compounds of general Formula I or non-toxic acid addition salt thereof, or of general Formula II, in association with a pharmacologically acceptable carrier. The preparations may take any of the forms customarily employed for administration of therapeutically active substances, but the preferred types are those suitable for oral administration and especially tablets, pills and capsules including the substance. The tablets and pills may be formulated in the usual manner with one or more pharmacologically acceptable diluents or excipients, for example lactose or starch, and include materials of a lubricating nature, for example calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

What is claimed is:

1. A compound which is 1-(isopropylamino)-3-[(o-methyl-α-phenyl benzyl)oxy]propan-2-ol and acid addition salts thereof.

2. A compound which is 1-(isopropylamino)-3-[(o-tert. butyl-α-phenylbenzyl)oxy]propan-2-ol and acid addition salts thereof.

3. A compound which is 1-(isopropylamino)-3-(di-2,6-xylylmethoxy)propan-2-ol and acid addition salts thereof.

References Cited

UNITED STATES PATENTS 2,520,153   8/1950   Lawson et al. _____ 260—284

OTHER REFERENCES

Petrow et al.: "Jour. Pharm. and Pharmacol.," vol. 8, pp. 666, 668 and 670–71 (1956).

Kyusaku: "Chemical Abstracts," vol. 65, p. 5390 (1960).

ROBERT V. HINES, Primary Examiner

U.S. Cl. X.R.

260—348, 570, 570.7, 611, 618, 649; 424—278, 330

PO-1050
(5/69)

UNITED STATES PATENT OFFICE
CERTIFICATE OF CORRECTION

Patent No. 3,557,193          Dated January 19, 1971

Inventor(s) Wijbe Thomas Nauta

It is certified that error appears in the above-identified patent and that said Letters Patent are hereby corrected as shown below:

Column 1, line 44, "or" should read - - at - -; and on line 6: "etiher" should read - - either - -. Column 3, line 2, "hte" should read - - the - -. Column 4, second table, "70.54" shou read - - 70.25 - -; and in the third table, line 45, "$R_3$" shou read - - $R_5$ - -.

Signed and sealed this 11th day of May 1971.

(SEAL)
Attest:

EDWARD M. FLETCHER, JR.
Attesting Officer

WILLIAM E. SCHUYLER,
Commissioner of Paten